(12) United States Patent
Alwin et al.

(10) Patent No.: US 8,620,495 B2
(45) Date of Patent: Dec. 31, 2013

(54) AIR DATA STALL PROTECTION SYSTEM

(75) Inventors: Steve F. Alwin, St. Paul, MN (US); Ronald Fritz Liffrig, Prior Lake, MN (US); Mathew L. Sandnas, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 1323 days.

(21) Appl. No.: 11/958,791

(22) Filed: Dec. 18, 2007

(65) Prior Publication Data
US 2008/0147255 A1 Jun. 19, 2008

Related U.S. Application Data

(60) Provisional application No. 60/875,690, filed on Dec. 19, 2006.

(51) Int. Cl.
*G05D 1/08* (2006.01)

(52) U.S. Cl.
USPC ............... 701/7; 244/134 R; 340/966; 701/4; 701/9; 701/14

(58) Field of Classification Search
USPC .......... 73/170.02, 180, 182, 170.01; 340/966, 340/945, 963; 701/4, 6, 14, 3, 5, 7, 9; 702/138, 144; 244/117 A, 117 R, 134 A, 244/134 B, 134 C, 134 D, 134 E, 134 F, 134 R
See application file for complete search history.

(56) References Cited

U.S. PATENT DOCUMENTS

| | | | | |
|---|---|---|---|---|
| 5,457,630 A | * | 10/1995 | Palmer | 701/3 |
| 5,595,357 A | * | 1/1997 | Catlin et al. | 244/1 R |
| 5,796,612 A | * | 8/1998 | Palmer | 701/4 |
| 6,140,942 A | * | 10/2000 | Bragg et al. | 340/962 |
| 6,325,166 B1 | | 12/2001 | Shimada et al. | |
| 6,668,640 B1 | * | 12/2003 | Alwin et al. | 73/170.02 |

FOREIGN PATENT DOCUMENTS

| | | |
|---|---|---|
| EP | 1391736 A1 | 2/2004 |
| EP | 1437599 A1 | 7/2004 |
| GB | 1076188 A | 7/1967 |

OTHER PUBLICATIONS

Extended Search Report and Written Opinion dated Sep. 22, 2010 for European application No. 07254949.6, filed Dec. 19, 2007.
Communication dated Dec. 16, 2011 in European Application No. 07254949.6, filed Dec. 19, 2007, 38 pages.

* cited by examiner

*Primary Examiner* — Khoi Tran
*Assistant Examiner* — Stephen Holwerda
(74) *Attorney, Agent, or Firm* — Edwards Wildman Palmer LLP; Scott D. Wofsy; Joshua L. Jones

(57) ABSTRACT

An electronic multi-function probe (MFP) is provided for positioning adjacent an aircraft skin. The electronic MFP includes a plurality of pressure sensing ports and an electronics housing. Positioned within the electronics housing are air data processing circuitry and stall protection system processing circuitry. The air data processing circuitry is configured to generate air data parameters, including airspeed and altitude, as a function of pressures at the plurality of pressure sensing ports. The stall protection system processing circuitry of the electronic MFP is configured to detect stall conditions as a function of angle of attack and at least one air data parameter from the air data processing circuitry, and to generate stall protection system outputs indicative of the detected stall conditions.

15 Claims, 13 Drawing Sheets

AIR DATA STALL PROTECTION SYSTEM

BACKGROUND

Air data systems that calculate the airspeeds, altitudes, aircraft angles of attack (AOA) and angle of sideslip (AOS) of an air vehicle utilizing independent probes that are not pneumatically coupled, but which have processors for interchanging electrical signals between the probes, are known in the art. These probes are sometimes referred to as electronic multi-function probes (MFPs) or air data sensing probes (ADSPs). One type of electronic MFP is the SmartProbe™ sold by Goodrich Corporation. Multi-function probes include processing circuitry located at the probe itself as part of its instrument package, and are therefore sometimes referred to as electronic multifunction probe air data computers. During sideslip of the air vehicle, compensation of various local (to the probes) parameters or signals, such as local AOA and local static pressure, is necessary for accurate determination of aircraft AOA, free stream static pressure and other aircraft parameters including determination of altitude from static pressure. This requirement for accuracy in altitude calculation and indications is particularly important in Reduced Vertical Separation Minimum (RVSM) air space.

To provide redundancy in estimations of aircraft airspeeds, altitudes, AOA and AOS, multiple electronic MFPs are used in an air data sensing system. The multiple electronic MFPs can be used in pairs to define multiple probe systems each having two electronic MFPs as members. A single electronic MFP can be a member of several different probe systems. It is known that estimations of local AOA at two MFPs in a probe system can be used to predict aircraft AOA and aircraft AOS. It is also known that aircraft AOA and AOS can be calculated or estimated by using the local pressure ratios, such as Psl/qcl, where Psl is the local static pressure and qcl is the local impact pressure (the difference between the total pressure and the local static pressure, $P_T$–Psl) from each of two uniquely located probes. In other words, each two-probe system can arrive at estimations of aircraft AOA and aircraft AOS which are a unique function of the local AOA estimations at the two probes or a unique function of the pressure ratio Psl/qcl at each probe.

Stall protection systems (SPSs) monitor aircraft flight conditions or situations and provide the crew with warnings when the aircraft is approaching an impending stall condition. Stall protection systems can also protect against actual stalls using a stick pusher or a control surface or input limiter to physically force the nose of the aircraft down before the impending stall condition is reached.

The discussion above is merely provided for general background information and is not intended to be used as an aid in determining the scope of the claimed subject matter.

SUMMARY

An electronic multi-function probe (MFP) is provided for positioning adjacent an aircraft skin. The electronic MFP includes both air data sensing and stall protection system functionality. The electronic MFP includes a plurality of pressure sensing ports and an electronics housing. Positioned within the electronics housing are air data processing circuitry and stall protection system processing circuitry. The air data processing circuitry is configured to generate air data parameters, including airspeed and altitude, as a function of pressures at the plurality of pressure sensing ports. The stall protection system processing circuitry positioned in the electronics housing of the electronic MFP is configured to detect stall conditions as a function of angle of attack and at least one air data parameter from the air data processing circuitry, and to generate stall protection system outputs indicative of the detected stall conditions.

In various embodiments, the electronic MFP can be of different types such as barrel type, vane type and cone type MFPs. Further, in various embodiments, the electronic MFP can be single or dual channel. In dual channel embodiments, the channels can be independent and dissimilar from each other to achieve dissimilar multi-MFP air data systems.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Disclosed embodiments include air data and stall protection system (SPS) probes, such as multi-function air data probes, which provide both air data detecting and SPS functions. The probes are configured to determine or detect airspeed and other air data parameters, either local to the probe (e.g., local air data parameters) or for the aircraft (e.g., aircraft or system level air data parameters). In some exemplary embodiments, the air data and SPS probes are embodied in the form of dual channel multi-function probes. However, the air data and SPS probes need not be embodied in dual channel probes, and can instead be embodied in single channel multi-function probes. Since dual channel multi-function probes are often more particular in their implementation, a discussion is first provided of some of the types of dual channel air data probes with which the integrated air data probes and SPS can be implemented. Illustration of the air data probes having integrated stall protection in the context of dual channel configurations does not limit embodiments to these dual channel configurations.

Figure 1A:
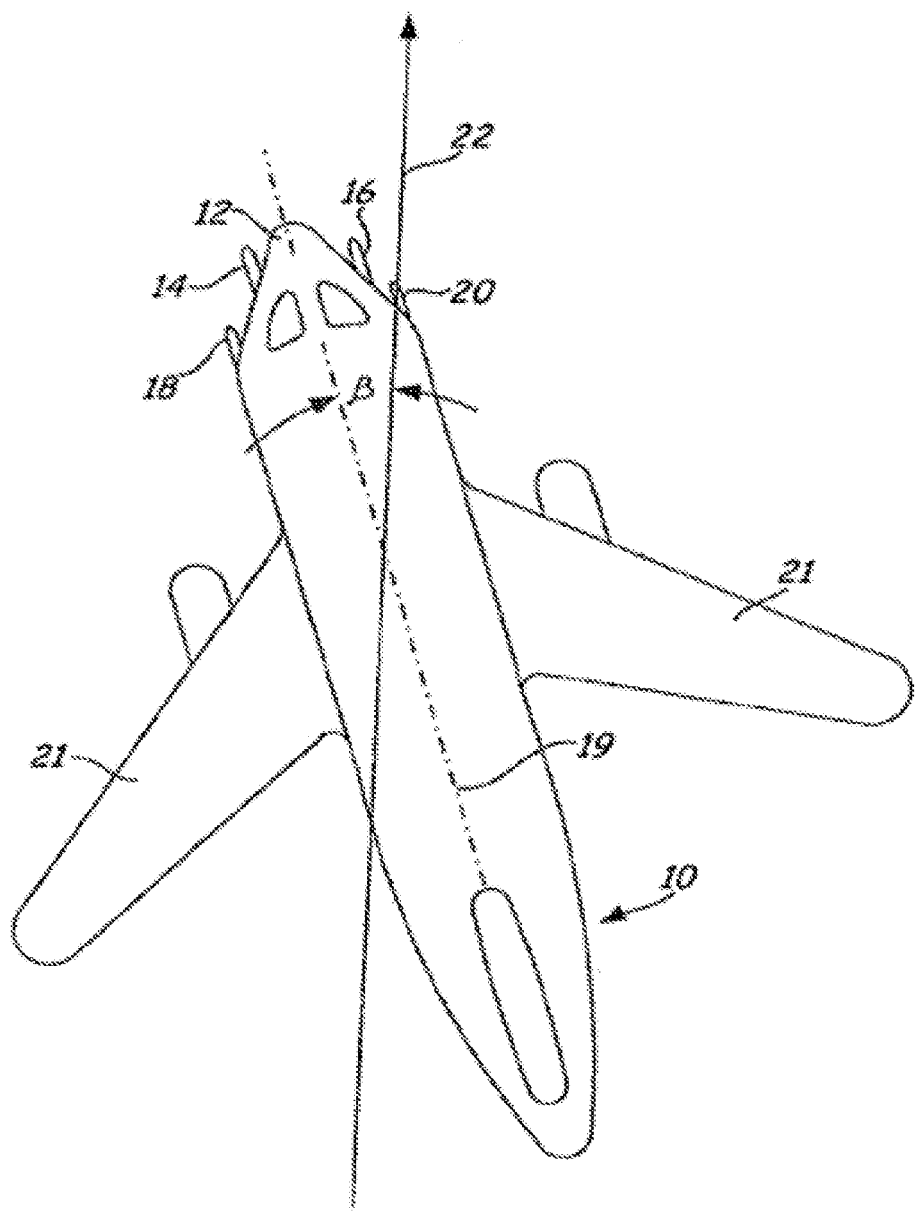
FIG. 1A is a top plan view of an aircraft illustrating a sideslip condition.

Referring to FIG. 1A, an aircraft indicated generally at 10 is shown with a nose portion 12. Mounted dual-channel air data sensing probes (ADSPs) or electronic multi-function probes (MFPs) are indicated schematically and generally at 14, 16, 18 and 20 to form a four-probe air data sensing system. As discussed below, combinations of the electronic MFPs can be used to define multiple two-probe and/or three-probe systems. In particular, combinations of the electronic MFPs can be used to define multiple independent and dissimilar air data systems. The number of independent systems depends on the number of sources of local static pressure and local angle of attack (AOA) that can be combined to give a unique representation of aircraft levels of AOA, angle of sideslip (AOS), and altitude.

The positioning of aircraft 10 is with respect to a center plane or center line 19 that is perpendicular to the normal plane of the wings 21. Center line 19 is shown in a greatly exaggerated sideslip condition where the path of travel of aircraft 10 is indicated at 22, and where there is a substantial angle β between the path of travel line 22 and the line or plane 19. Angle β is the aircraft AOS, which is defined herein as an aircraft parameter. The aircraft essentially is yawing to the left in FIG. 1. As the airflow passes across the aircraft, the probes 14 and 18 will be subjected to different flow conditions, insofar as the local angle of attack and local static pressure is concerned, than are the probes 16 and 20 and most likely different from each other.

Figure 1B:
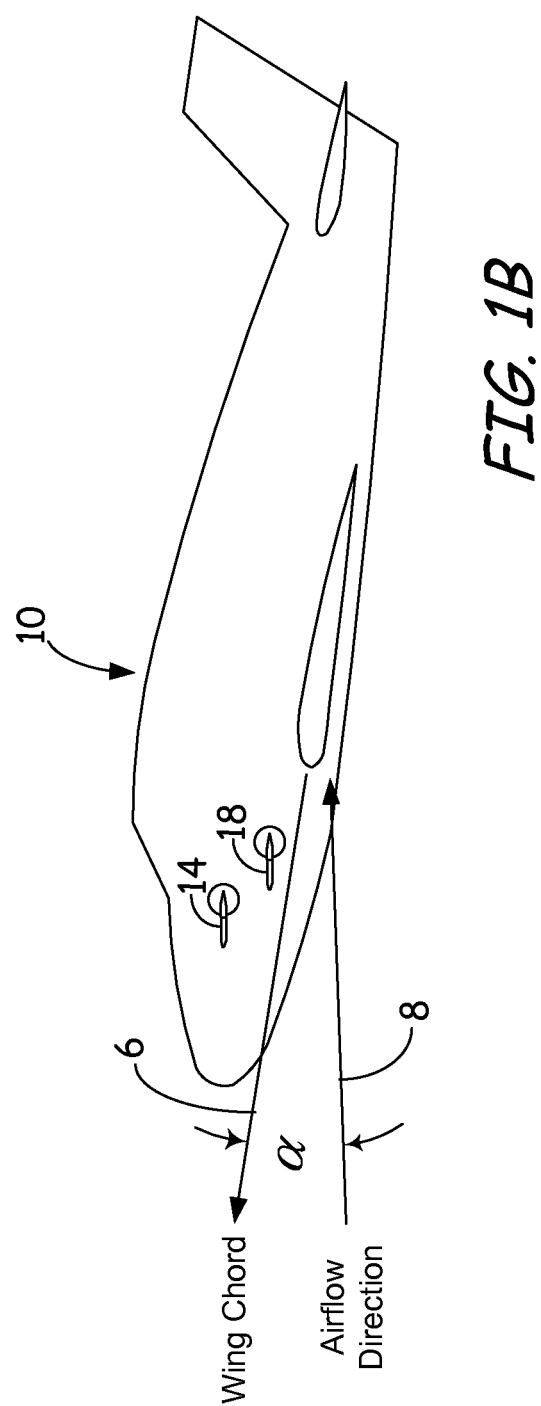
FIG. 1B is a side view of an aircraft illustrating an angle of attack condition.

Another aircraft parameter is aircraft AOA, designated in side view FIG. 1B as angle α. The AOA of aircraft 10 is the angle between the direction of airflow (designated by reference number 8 in FIG. 1B) and the wing chord (designated by reference number 6 in FIG. 1B) of aircraft 10. It also can also be envisioned that if the aircraft changes AOA, because of the yaw angle, the amount of change in pressure on one side of the aircraft would be different than that on the other side of the aircraft. When the probes are only electrically connected together, it may be difficult to simply average these changes to obtain a sideslip-corrected static pressure reading. The AOS value can eventually be used as a correction factor to compensate for this angle in a systematic manner.

An electronic multi-function probe or MFP is defined as a probe in which a computer is integrally attached as a processor to the probe, and the sensing portions of the probe itself protrude in the air stream that moves past the aircraft skin. The processor is in an integrated housing immediately inside the skin. Outputs from electronic MFPs can include digital electrical signals representing pressures derived from sampling the pressure readings from internal pressure sensors and/or air data parameters such as airspeed, etc. The internal pressure sensors of an electronic MFP can be either differential sensors or absolute sensors that receive the pressure signals and convert them into electrical signals that are then digitized.

The probes 14, 16, 18 and 20 may be similar to probes such as that shown in the U.S. Pat. No. 4,378,696, or other similar patents. In some illustrated embodiments provided as examples, the probes are primarily dual-channel electronic MFPs which can be used to aid in achieving system dissimilarity, as is discussed below in greater detail. It is not necessary, however, that the probes be dual channel probes, nor that systems using the probes achieve system dissimilarity. As shown schematically in FIG. 2A, in one example embodiment the probes have barrels 14A, 16A, 18A and 20A, with suitable ports for sensing total pressure at leading ends of the probes indicated at 14B, 16B, 18B and 20B. The angle of attack sensing ports are placed on the top and bottom of the probes, and the top ports are illustrated schematically at 14C, 16C, 18C and 20C. Mating ports are on the lower portion, as is well known, for measuring the angle of attack by sensing the differentials in pressure between the upper port and the lower port. The lower port on the probes will sense a pressure designated $P\alpha_1$, and the upper ports shown at 14C, 16C, 18C and 20C sense a pressure designated $P\alpha_2$. Each of the probes 14, 16, 18 and 20 is provided with a separate instrument housing 14D, 16D, 18D and 20D, respectively.

In alternative embodiments, features 14A, 16A, 18A and 20A are vanes, cones or other types of sensing devices, instead of barrels. The various drawings illustrating one or more of electronic MFPs 14, 16, 18 and 20 are to be interpreted as including different types of electronic MFPs rather than just those using a barrel. For example, referring for the moment to FIG. 2B, shown is an electronic MFP 150 which could be used as one of electronic MFPs 14, 16, 18 and 20 in alternate embodiments. MFP 150 includes a vane 152 which rotates to provide an indication of AOA. Located on vane 152 are one or more pressure sensing ports 154, such as a pitot pressure sensing port, for providing additional pressure measurements. Although not required in all embodiments, the electronic MFP 150 shown in FIG. 2B also includes a total air temperature (TAT) probe 156 formed integrally with the remainder of the electronic MFP 150. An instrument housing 158, which can be similar to housings 14D, 16D, 18D and 20D, is positionable inside the skin of the aircraft while the vane protrudes into the air stream that moves past the skin of the aircraft. Instrument housing 158 includes circuitry 67, for example suitably programmed or configured processing circuitry, which uses air data to implement SPS functions. As will be discussed below in greater detail, instrument housing 158 can include two channels of circuitry (as illustrated in FIG. 2B, channel A circuitry 160-1 and channel B circuitry 160-2). Stall protection system circuitry 67 can be implemented in either or both of channels 160-1 and 160-2 in dual channel embodiments, or just generally within housing 158 in single channel embodiments.

In each of the various embodiments of electronic MFPs and air data systems using MFPs, where the second channel (e.g., channel B) is shown, the second channel should be considered optional. Thus, disregarding the second channel for single channel embodiments, various figures illustrating the dual channel option also provide an illustration of single channel embodiments. Further, in various embodiments which do include dual channels, the dual channels can be configured to achieve dissimilarity between channels for certification or other purposes, though the channels need not be dissimilar in all embodiments. While disclosed embodiments having stall protection functions implemented by an air data probe can work particularly well for certain applications in dual channel configurations, the disclosed embodiments are not limited to dual channel configurations.

Figure 2A:
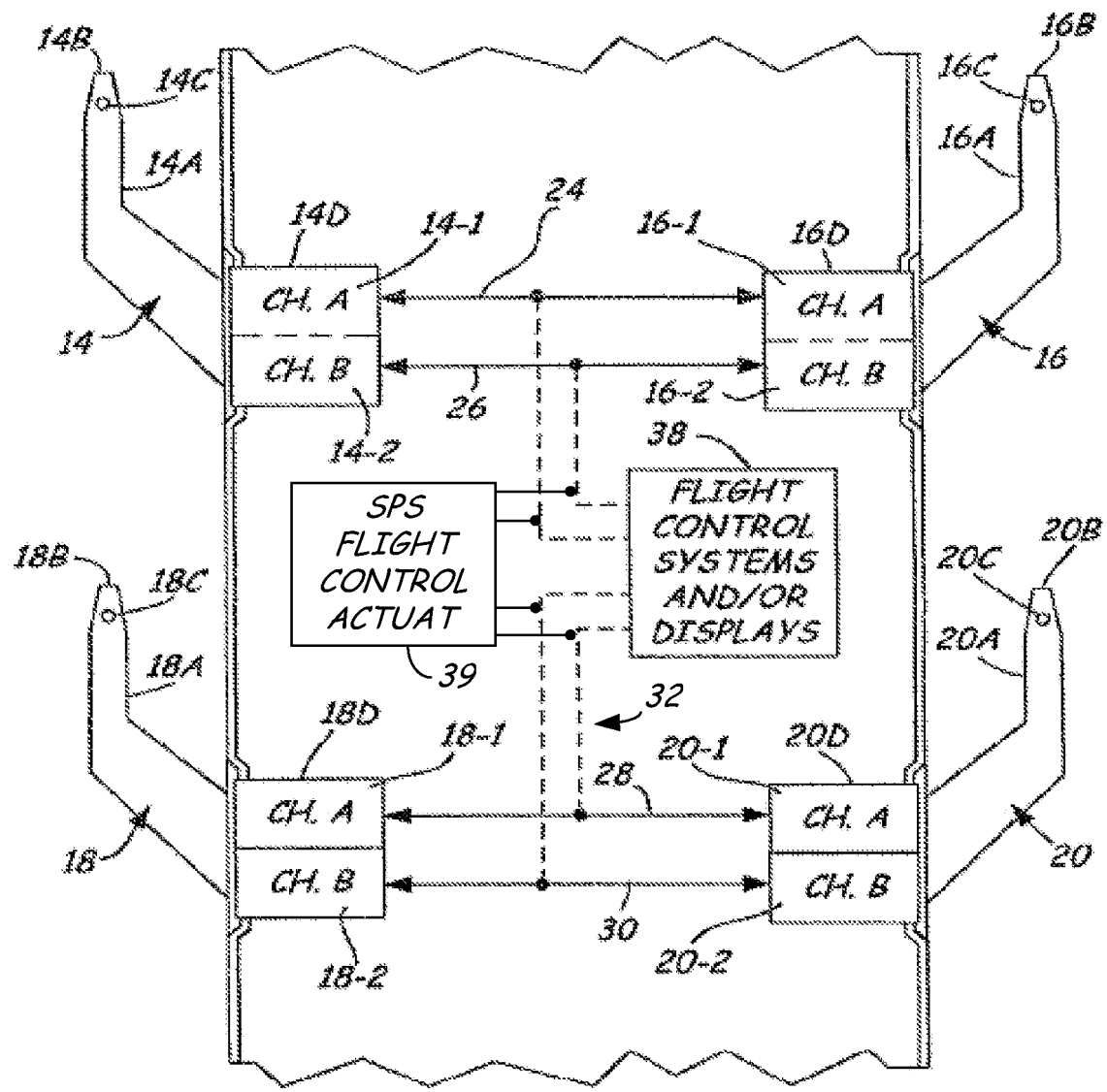
FIG. 2A is a schematic representation of a cross section of a nose portion of an aircraft showing placement of dual-channel air data sensing probes, called electronic multi-function probes (MFPs), made and configured to function in accordance with disclosed embodiments.
Figure 2B:
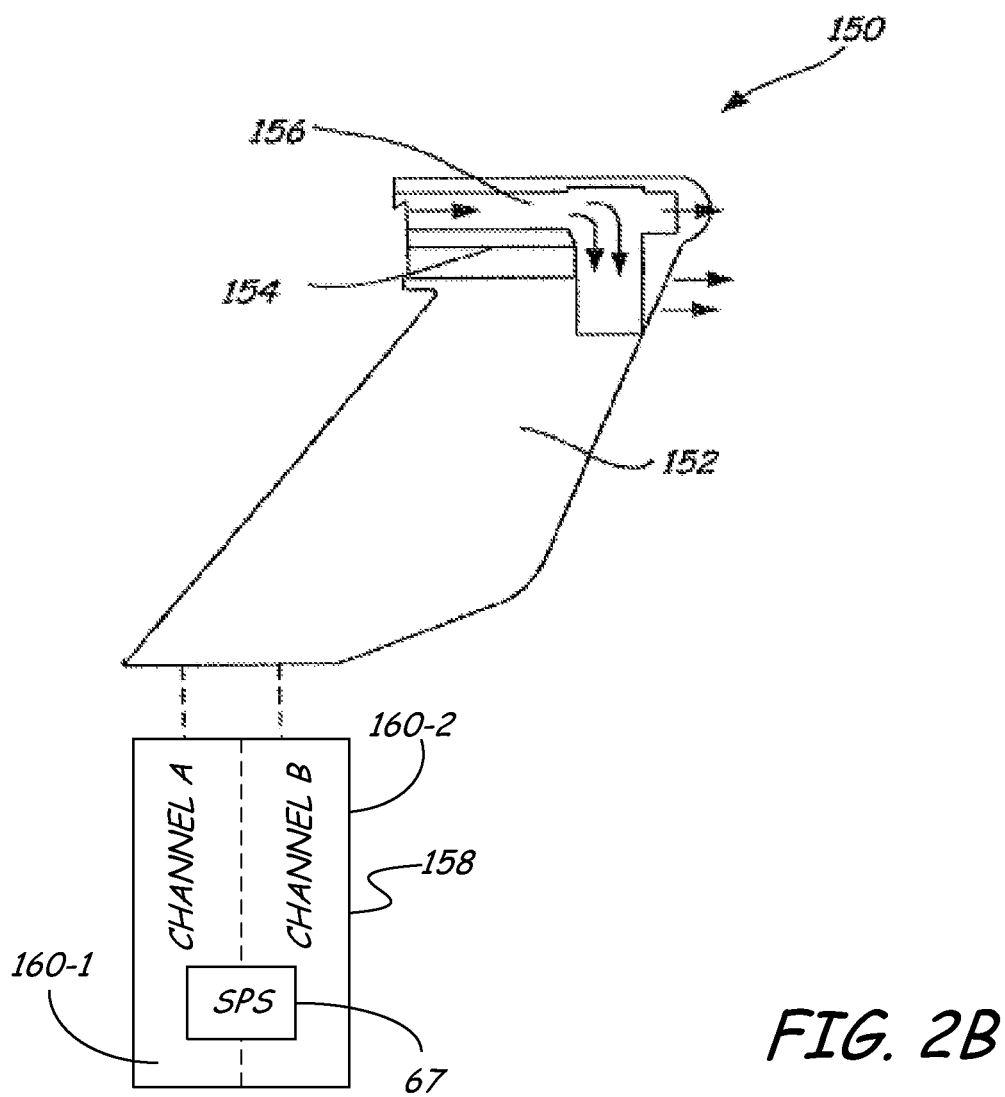
FIG. 2B is a diagrammatic representation of a vane-type of electronic MFP in accordance with some embodiments.
Figure 2C:
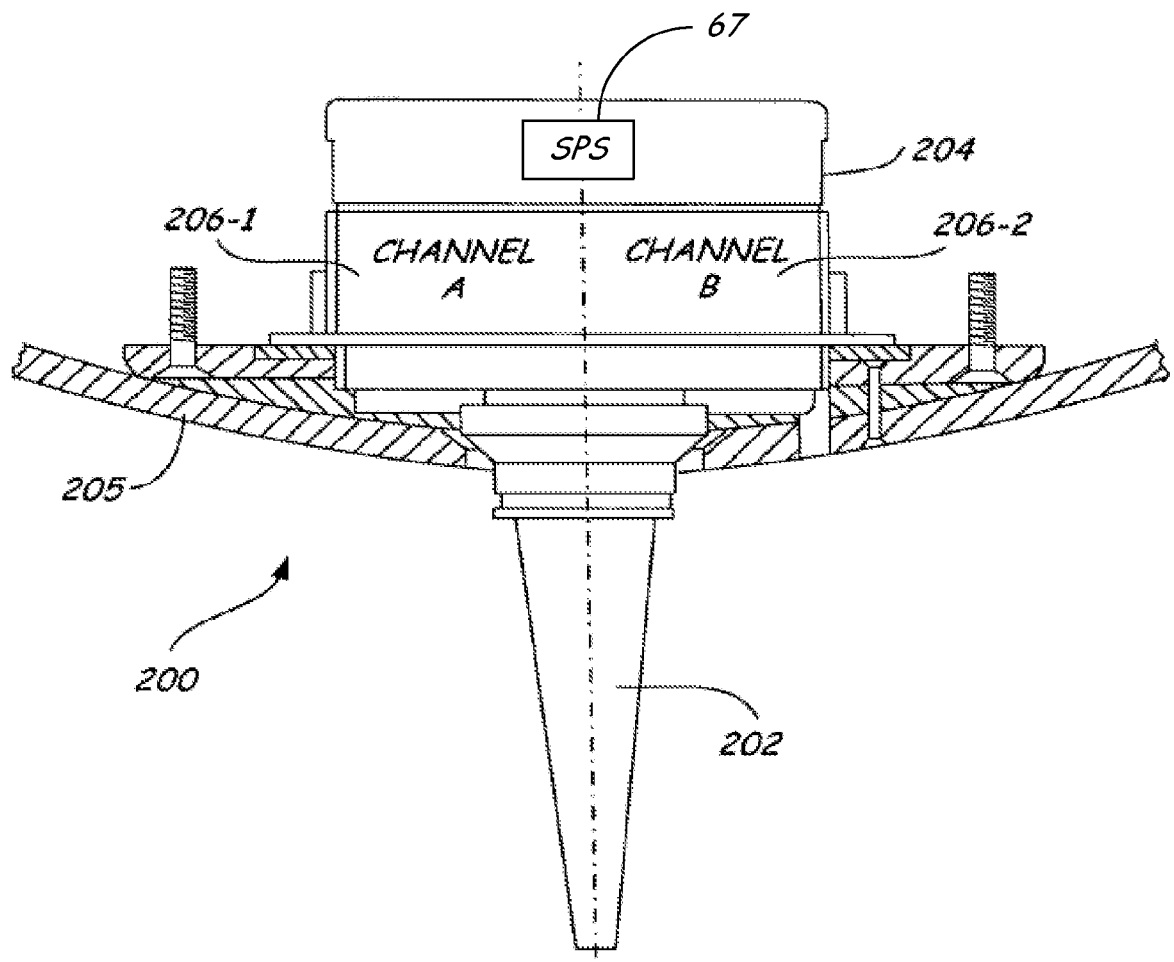
FIG. 2C is a diagrammatic representation of a cone-type of electronic MFP in accordance with some embodiments.

Referring for the moment to FIG. 2C, yet another type of electronic MFP is shown. Electronic MFP 200 is a cone-type of electronic MFP. For example, MFP 200 can be similar to cone-type MFPs disclosed in U.S. Pat. Nos. 6,012,331 and 6,076,963, but will include SPS circuitry as described below. Cone 202 protrudes into the air stream that moves past the skin 205 of the aircraft, while an instrument housing 204 is positionable inside the skin of the aircraft. Positioned in instrument housing 204 is SPS circuitry 67 configured to perform SPS functions using air data calculated within probe 200. In accordance with some disclosed embodiments, electronic MFP 200 includes first and (optionally) second electronics channels (channel A 206-1 and channel B 206-2 illustrated in FIG. 2C) positioned in instrument housing 204. Again, SPS circuitry 67 can be implemented in either or both of these channels. Although barrel, vane and cone types of electronic MFPs are shown in the figures, disclosed embodiments can extend to other types of dual-channel electronic MFPs.

Sometimes, the barrel, vane or cone, sensing ports and other related portions of the probe (besides the electronics) are referred to as the MFP. As used herein, the probe (or MFP) and electronics combination is referred to as an electronic MFP. More specifically, as is described below in greater detail, some disclosed embodiments include dual-channel electronic MFPs and multi-probe systems using the same to provide independent and dissimilar air data systems. It must be noted that the particular probe or MFP configuration shown (i.e., barrel and port configurations, vane and port configurations or cone and port configurations) is provided as an example, but does not limit the disclosed embodiments to this particular design. Disclosed embodiments also apply more generally to single channel and dual-channel electronic MFPs having integrated stall protection system circuitry and functionality, as described below in greater detail, regardless of the particular probe or MFP design.

In the example embodiment provided in FIG. 2A, each housing can include Channel A circuitry (14-1, 16-1, 18-1, 20-1) and Channel B circuitry (14-2, 16-2, 18-2 and 20-2), with the Channel A circuitry of each probe being dissimilar to the channel B circuitry of the probe. The term "dissimilar" used in the context of disclosed embodiments can mean any of several related things. From the perspective of a single electronic MFP, its respective channels can be dissimilar by utilizing different chip sets (e.g. different microprocessors from different manufacturers) and other components, different software or firmware (for example developed by different software or firmware development teams), as well as implementation of different functions within each of the two channels. However, from a two-probe dual-channel system perspective, the system provided by combining a channel from a first electronic MFP with a channel from a second electronic MFP can also be dissimilar from a second system configured from the second channels of each of these two MFPs. While electronic MFPs 14, 16, 18 and 20 are shown in FIGS. 1 and 2, in some embodiments, only two dual-channel (or alternatively single channel) electronic MFPs such as probes 14 and 16 or other combinations such as probes 16 and 18 are included.

As shown in FIG. 2A, in one embodiment the channel A circuitry 14-1 of electronic MFP 14 is electrically connected to the channel A circuitry 16-1 of electronic MFP 16 to form a first two-probe system designated generally at 24. Similarly, the channel B circuitry 14-2 of electronic MFP 14 is electrically coupled to the channel B circuitry 16-2 of electronic MFP 16 to form a second two-probe system designated at 26. Likewise, the channel A circuitry 18-1 and the channel B circuitry 18-2 of electronic MFP 18 are electrically coupled, respectively, to channel A circuitry 20-1 and channel B circuitry 20-2 of electronic MFP 20 to form two-probe systems 28 and 30. Each of these two-probe systems can be electrically connected to flight control systems 38 and/or stall protection system (SPS) flight control actuation 39 by data bus 32 or other electrical connections. SPS flight control actuation includes, for example, controllers and actuators for actuation of stick pushers, limiters, and other flight control apparatus and functions which are used to limit or control aircraft maneuvers when stall conditions are detected by SPS circuitry 67 (not shown in FIG. 2A), but located within the housing (e.g., 14D, 16D, 18D and/or 20D) of one or more of the probes.

Figure 3:
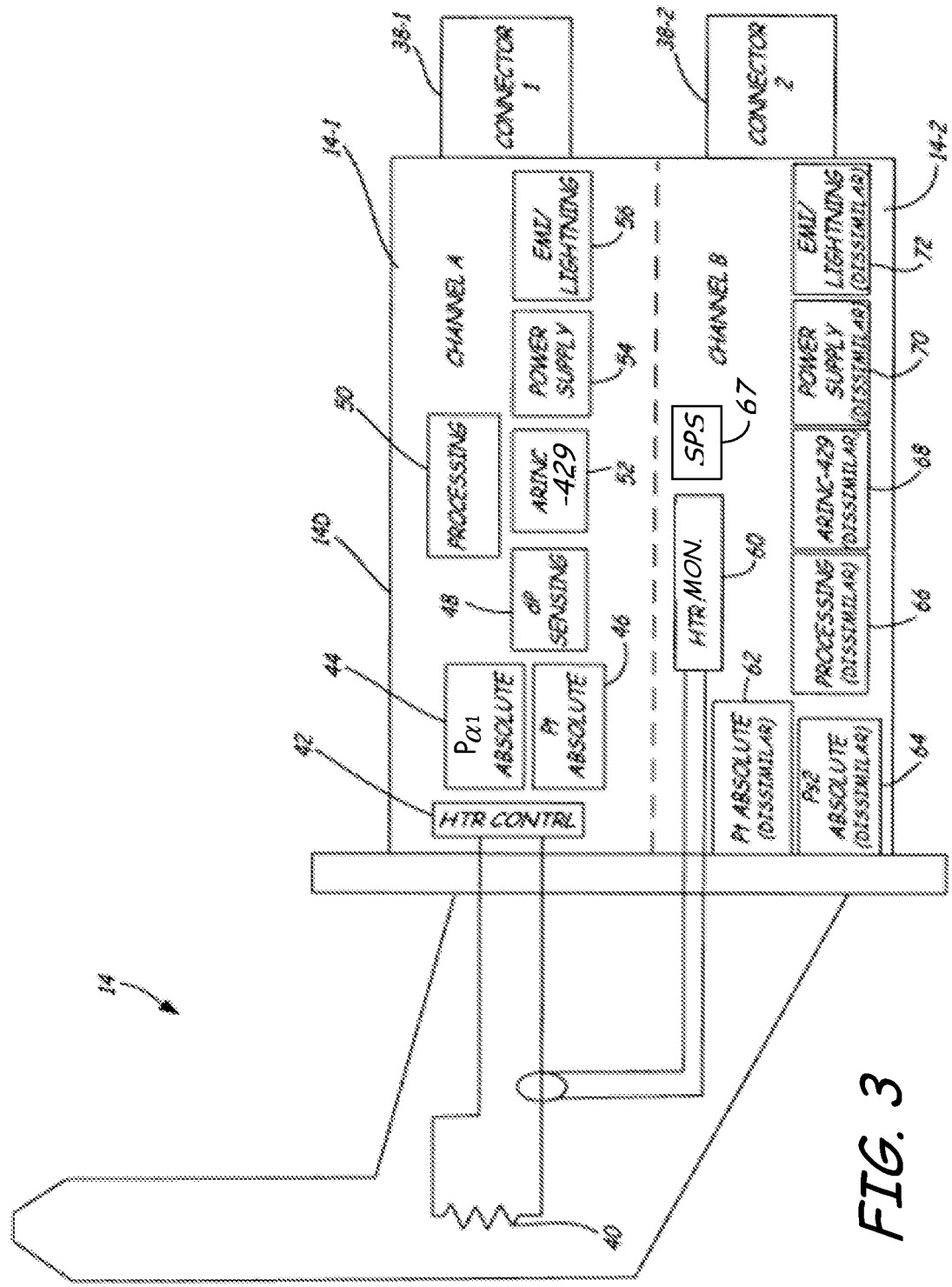
FIG. 3 is a block diagram illustrating circuitry of an electronic MFP including stall protection system processing components.

FIG. 3 is a diagrammatic illustration of a dual-channel electronic MFP 14 in accordance with one example embodiment. In one embodiment, electronic MFP 14 is a left hand side electronic MFP. As shown in FIG. 3, channel A circuitry 14-1 and channel B circuitry 14-2, each contained within housing 14D, have respective connectors 38-1 and 38-2 for connecting these portions of electronic MFP 14 to corresponding portions of a second electronic MFP and/or to the flight control systems and display systems 38.

In this example embodiment, electronic MFP 14 includes a heater element 40 used for de-icing the probe. Channel A circuitry 14-1 includes a heater control circuit 42, while channel B circuitry 14-2 includes a heater monitor circuit 60. Relating to the measurement of the various pressures described above, in this embodiment channel A circuitry 14-1 includes an absolute pressure sensor 44 which measures the first angle of attack pressure $P_{\alpha 1}$. A second absolute pressure sensor 46 measures the total pressure, while a differential pressure sensor 48 provides the main AOA measurement which is compensated using the other pressures using computation methods of the type which are known in the art. Processing circuitry 50 can include one or more microprocessors which manipulate the data provided by pressure sensors 44, 46 and 48, as well as possibly others, in order to calculate local and aircraft parameters such as airspeed, altitude, AOA, AOS and static pressure. Communication circuitry 52 is provided for facilitating communications between processing circuitry 50 and other electronic MFPs or systems via connector 38-1. In some embodiments, communication circuitry 52 is ARINC-429 circuitry. Power supply circuitry 54 provides power to the various components in channel A 14-1, while protection circuitry 56 provides electromagnetic interference (EMI) and lightning protection for the circuitry.

In this example embodiment, channel B circuitry 14-2 includes first and second absolute pressure sensors 62 and 64 for measuring other pressures of the type described above with reference to the electronic MFP ports. Processing circuitry 66, communication circuitry 68, power supply circuitry 70 and protection circuitry 72 all provide similar functions to those described above with reference to channel A circuitry 14-1, but instead provide these functions for channel B circuitry 14-2.

In this dual channel embodiment, either or both of processing circuitry 50 and processing circuitry 66 are configured to calculate air data including airspeed and altitude. These circuitries can also be configured to calculate other air data parameters, including AOA, AOS, static pressure, etc. Also implemented within housing 14D is SPS circuitry 67. Circuitry 67 uses air data from processing circuitry 50 and/or processing circuitry 66 to detect stall conditions of the aircraft and, in response, to control SPS flight actuation 39 (shown in FIG. 2A). Although shown in channel B in FIG. 3, SPS circuitry 67 can be implemented in either or both of channels A and B. Further, SPS circuitry 67 can be embodied within processing circuitry 50 and/or processing circuitry 66. For example, the air data calculation functions and the SPS functions can each be program modules used to configure the same processor or processors. Also, one of channels A and B can form a command function of the SPS, while the other of channels A and B performs a monitoring function of the SPS to ensure proper operation. Command functions include, for example, flight control, stick pusher and other actuation or control limitation functions.

FIG. 3 illustrates one configuration for electronic MFPs used on a first side of the aircraft. For example, while FIG. 3 illustrates electronic MFP 14, these configurations can be used for each of electronic MFPs 14 and 18 allowing a single left side electronic MFP configuration and part number to be employed for an aircraft, thereby preventing the need for manufacturing, stocking, servicing, etc. of too many different electronic MFP configurations for a particular aircraft. On the opposite side of the aircraft, the channel A circuitry and the channel B circuitry may be switched in regard to which functions are performed by these channels, so that a combination of channel A circuitry from a left side electronic MFP with channel A circuitry from a right side electronic MFP will provide all of the pressure measurement necessary for that two-probe system to calculate the local and/or aircraft parameters required.

Still referring to FIG. 3, in addition to a separation of various pressure measurements between channel A and channel B in some embodiments, in order to aid in achieving dissimilarity between systems, the two channels can provide their respective independent measurements of pressure and subsequent calculation of air data parameters while incorporating independent and dissimilar complex hardware and software. For example, the processing circuitry 50 and 66 used in the two separate channels can include different microprocessors or microcontrollers provided by different chip manufacturers. For example, in one embodiment, processing circuitry 50 can include a Motorola HC16 microcontroller, while processing circuitry 66 used in channel B can include a Texas Instruments TMS320C33 DSP. As a further example, in one embodiment the ARINC-429 transceiver used in communication circuitry 52 of channel A 14-1 is an ILC Data Device Corporation transceiver DDC 00429, while the ARINC-429 transceiver used in communication circuitry 68 of channel B 14-2 is a Holt 8582 device.

Generally, in making channel A dissimilar from channel B, it can be advantageous to include as much dissimilarity as possible between the pressure sensor technologies used, the types and/or manufacturers of the central processing units used, the software/firmware used (including development of the software/firmware by separate development teams if desired), the communication devices used (i.e., the ARINC interfaces), the types of field programmable gate arrays (FPGA's), the types of power supplies, the types of EMI and lightening protection, and the probe heater monitoring and supply. The greater the degree of dissimilarity between the two channels, the more remote the possibility of a common mode error occurring.

Figure 4:
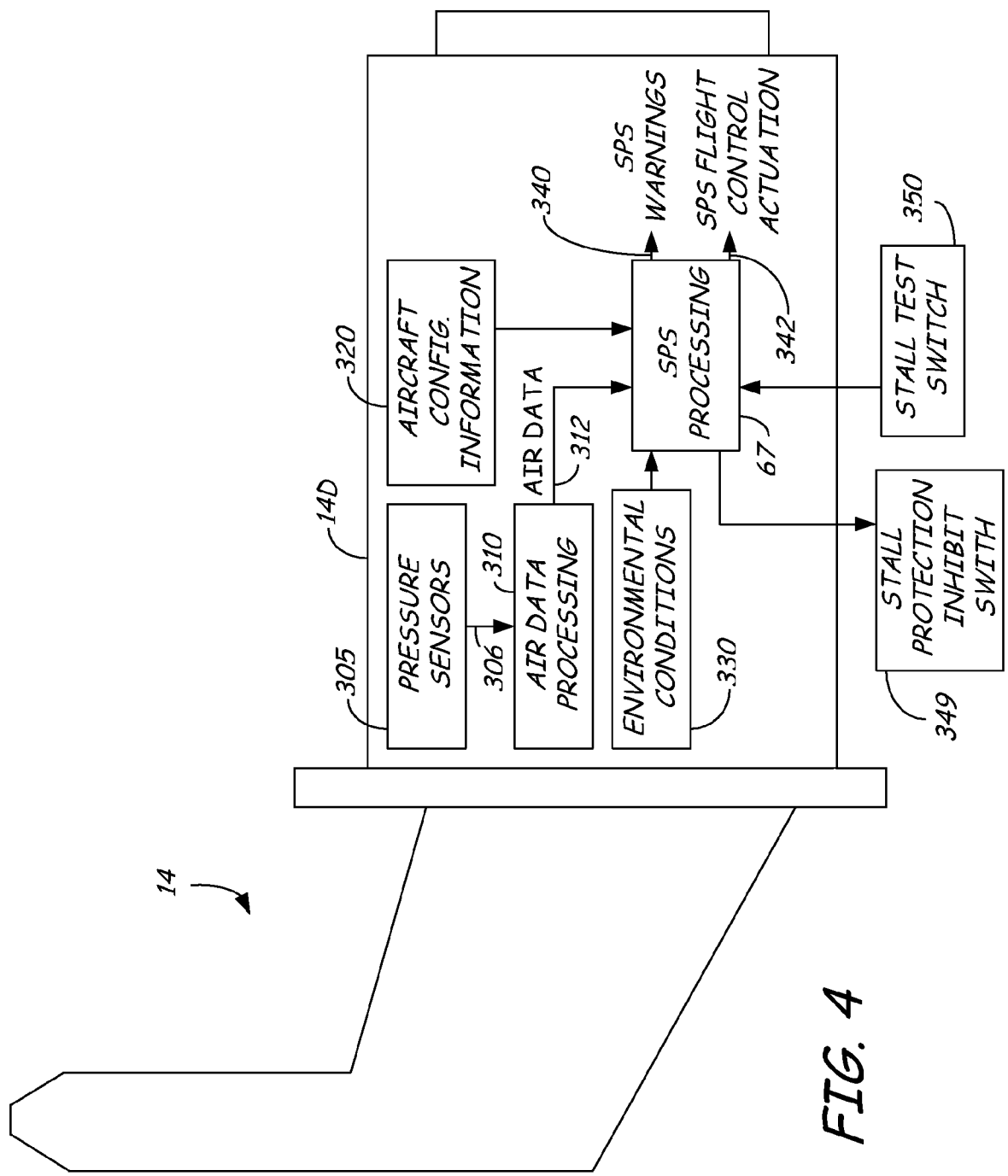
FIG. 4 is a block diagram illustrating circuitry of an electronic MFP illustrating additional stall protection system components and/or features.

Referring now to FIG. 4, shown is a diagrammatic illustration of SPS functionality within an electronic MFP 14. In this example embodiment, air data probe 14 is a single channel electronic MFP, but this need not be the case. The structural and functional configurations shown in FIG. 4 can be implemented in dual channel embodiments as well.

As shown in FIG. 4, various functions implemented by circuitry within instrument housing 14D, as well as various information obtained from sources outside of housing 14D, are represented in block diagram format. The various pressure sensors discussed above are represented at 305, providing pressure measurements 306. Air data processing circuitry 310, corresponding for example to processing circuitry 50 and/or 66 from FIG. 3, is configured to use these pressure measurements to generate air data parameters 312. These air data parameters include airspeed and altitude. These air data parameters 312 will generally also include multiple other aircraft-level air data parameters and/or local air data parameters, such as AOA, AOS, true Mach, altitude rate, static air temperature, total pressure, static pressure, impact pressure, barometric corrected altitude, vertical speed indicated/calibrated airspeed, true airspeed, etc.

Also shown in FIG. 4 is aircraft configuration information 320 and environmental conditions information 330. Generally, aircraft configuration information 320 is information indicative of the configuration, position or status of aircraft structures and components. For example, aircraft configuration information can include some or all of spoiler positions, slat positions, flap positions, landing gear positions, engine torque, propeller angles, etc. Typically, aircraft configuration information 320 will be provided to air data probe 14 from other systems within the aircraft. Environmental conditions information 330 is also typically provided to electronic MFP 14, and can include information such as icing conditions.

Using air data 312, aircraft configuration information 320 and environmental conditions information 330, SPS processing circuitry 67 generates SPS warnings outputs 340 and SPS flight control actuation outputs 342. SPS warnings outputs 340 can include outputs which cause aural (via speakers) or visual (via a display) warnings of the presence of the stall condition. When the SPS circuitry 67 in at least one electronic MFP (e.g., 14) has detected that a stall condition will occur if the aircraft continues to increase AOA or lose airspeed, it commands an aural stall warning which is sent to the aircraft avionics via a communication line or bus, such as over an ARINC 429 bus.

In some embodiments, SPS processing circuitry can also be configured to facilitate low speed awareness. In these embodiments, the probe 14 computes the ratio between the airspeed at the given AOA and the airspeed at the zero lift AOA. This ratio can be converted to airspeed and displayed on a flight display speed tape. The stall aural warning is independently calculated, but in some embodiments will sound when the low airspeed awareness ratio is greater than a predetermined threshold. Also, in some embodiments, the electronic MFP processing circuitry is configured to compute a ratio which is 1.3 times the anticipated stall speed ($V_{stall}$). This ratio, referred to herein as the "Green Circle," can be converted to airspeed and displayed on the primary flight display of the avionics system.

Figure 5:
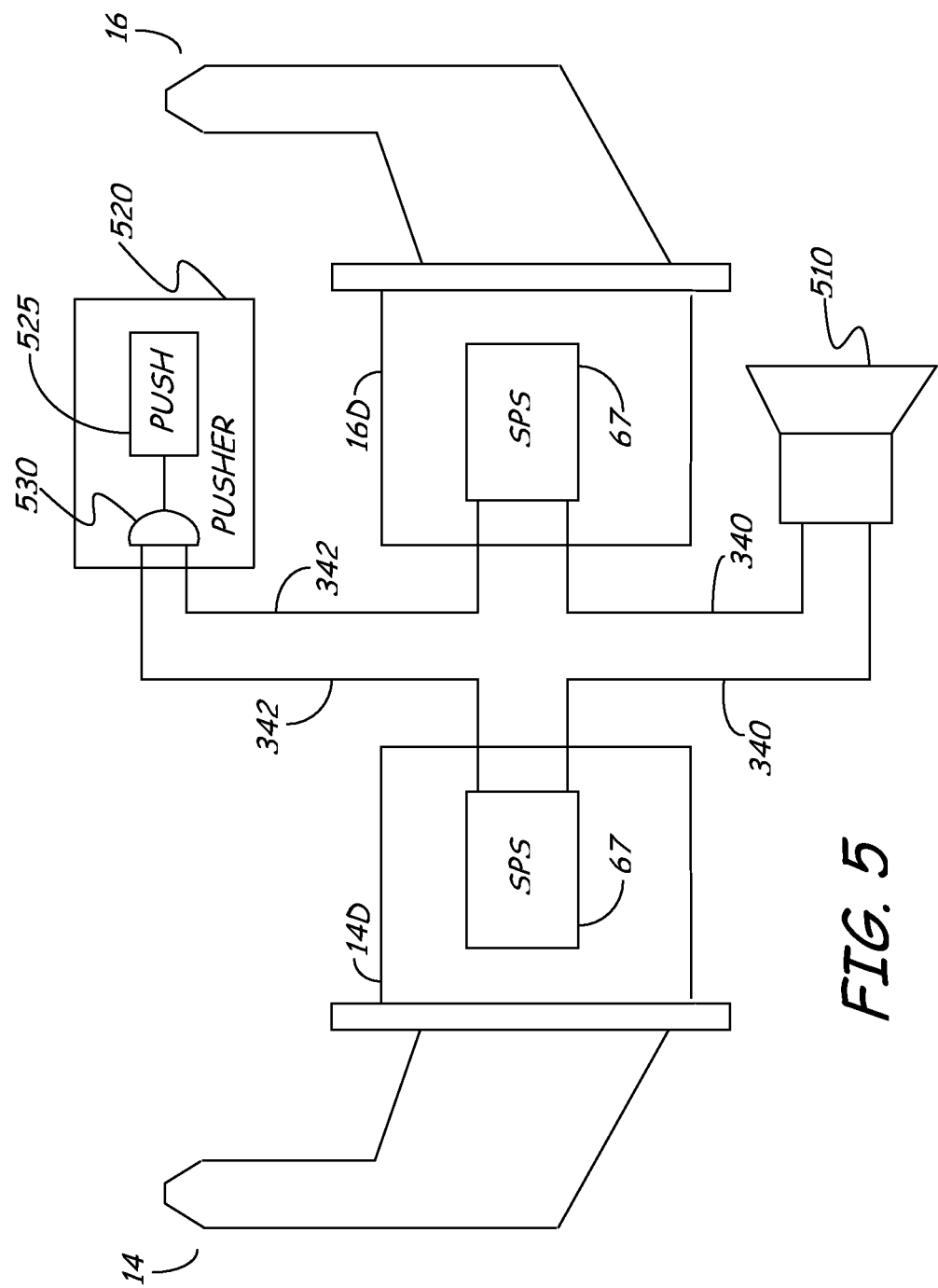
FIG. 5 is a block diagram illustrating an air data system, including two electronic MFPs having stall protection system processing components, stall warning system warnings and flight control actuation outputs.

SPS flight control actuation outputs 342 can include discrete stick pusher commands for controlling a stick pusher to automatically control the aircraft AOA to avoid a stall. In some embodiments, each electronic MFP can independently generate stall warnings 340. However, in order to provide stall protection, in some embodiments multiple electronic MFPs must detect the stall condition and command the pusher. This is illustrated, for example, in FIG. 5. In FIG. 5, stall warning commands from either of electronic MFPs 14 or 16 can cause an audible warning via a speaker 510. However, for stick pusher 520, the push command 525 is only implemented if both of electronic MFPs 14 and 16 generate SPS flight control actuation outputs 342 indicating a stall condition. This is illustrated diagrammatically by the logical AND function 530 in the control pathway of stick pusher 520, but can be implemented using any desired technique.

In one example embodiment, SPS processing circuitry is configured to use AOA and other air data parameters, as well as external inputs, to generate (or inhibit) anticipated stall angles, aural warning commands, and stick pusher commands. In this example, the external inputs include: flap position, landing gear position, deicing status and Altitude and Heading Reference System (AHRS) information including pitch angle, roll angle, body pitch rate, body longitudinal acceleration and body normal acceleration. These inputs can be sent between cross-side electronic MFPs (e.g., between electronic MFPs 14 and 16 shown in FIG. 1) for voting and comparison functions.

In some embodiments, the stick pusher 520 has limited authority, only being able to push the nose of the aircraft down by five degrees, for example. Also, as shown in FIG. 4, a stall protection inhibit switch 349 and a stall test switch 350 can be included to effect operation of SPS circuitry 67 in generating SPS warnings output 340 and SPS flight control actuation output 342. Switches 349 and 350 are located in the cockpit of the aircraft or other accessible locations, but not on the MFPs themselves. When stall protection inhibit switch 349 is depressed or actuated, the stick pusher and aural warning are inhibited. The stall test switch 350 can be actuated, with the aircraft on the ground, to initiate a test of the SPS. In some embodiments, the SPS circuitry can provide a control signal directly to the flight control system to limit actuation of a control surface regardless of pilot input, thus protecting the aircraft from entering the stall condition.

Figure 6:
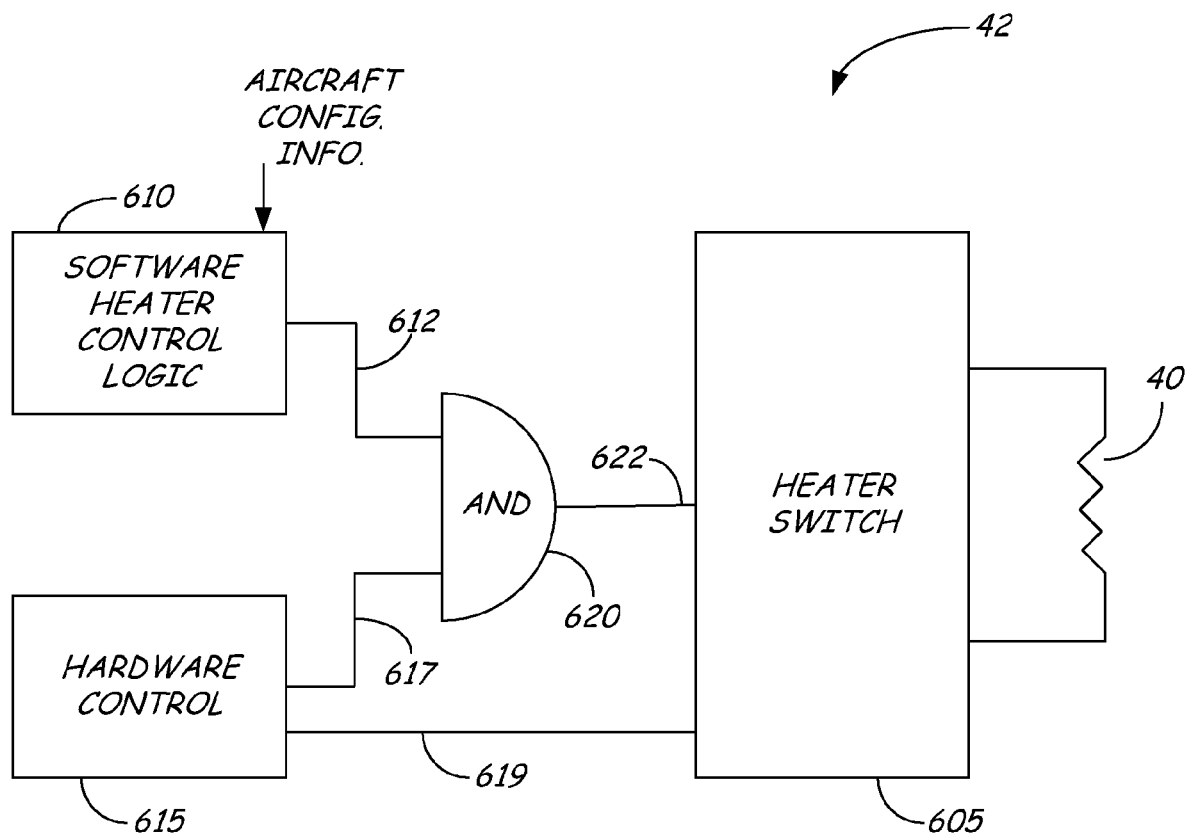
FIG. 6 is a block diagram illustrating hardware heater control logic components implemented in some electronic MFP embodiments.

Referring now to FIG. 6, shown are features of heater control circuit 42 (also shown in FIG. 3) for controlling heater element 40 of an electronic MFP in some example embodiments. In these example embodiments, heater control circuit 42 implements hardware priority heater control. As illustrated, heater element 40 is controlled by a heater switch 605 which controls current through the element. The switch is in turn controlled by a heater control signal 622. To turn on heater element 40 to effect heating of the electronic MFP, software heater logic control circuitry 610 can generate a software control signal 612 based on aircraft configuration information. Similarly, a hardware control switch or circuit 615 generates a first hardware control signal 617 if software control of heater element 40 is to be allowed. Using a logical AND gate 620, this software control signal 612 can result in the heater element 40 being turned on (via heater control signal 622) only if the first hardware control signal 617 enables it to do so. Hardware control switch or circuit 615 can disable or override software control by generating a logical "0" in control signal 617, and can enable software control by generating a logical "1" in control signal 617. A second hardware control signal 619 assures direct that hardware control of heater element 40 can always be achieved as well.

Figure 7:
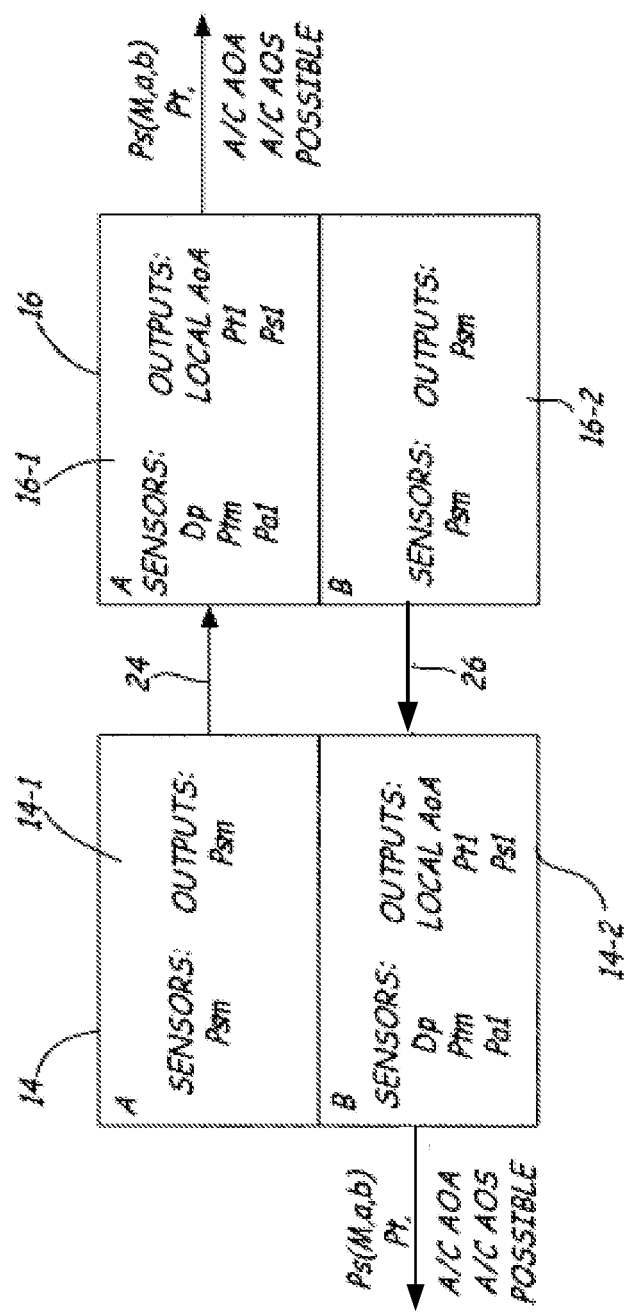
FIGS. 7 and 8 illustrate various example embodiments having different circuitry configurations for left side and right side dual-channel electronic MFPs.

Referring now to FIG. 7, a first embodiment illustrating the division of functionality between the channel A circuitry and the channel B circuitry of a left hand side electronic MFP such as electronic MFP 14, as well as the division of functionality between the channel A circuitry and the channel B circuitry of a right hand side electronic MFP such as electronic MFP 16, is illustrated. In this particular embodiment, which is provided by way of example only, channel A circuitry 14-1 of electronic MFP 14 includes a pressure sensor for measuring the static pressure $P_{sm}$, and outputs static pressure measurements. Channel A circuitry 16-1 of electronic MFP 16, which combines with channel A circuitry 14-1 of electronic MFP 14 to form system 24, includes an absolute pressure sensor to measure the total pressure $P_{tm}$, an absolute pressure sensor to measure half of the AOA pressure $P_{a1}$ (or $P_{\alpha 1}$), and a differential pressure sensor $D_p$ to measure the differential pressure between the two AOA pressure sensing parts ($P_{a1}-P_{a2}$ or $P_{\alpha 1}-P_{\alpha 2}$). As is known in the art, the differential pressure sensor measurement and the angle of attack pressure measurement can be combined to determine the local AOA. Thus, channel A 16-1 of electronic MFP 16 can provide a local AOA, a local total pressure $P_{tl}$ and a local static pressure $P_{sl}$ using the processing devices in channel A circuitry 14-1 or channel A circuitry 16-1 of either of the electronic MFPs. Known methodology can then be used to generate aircraft parameters such as aircraft AOA or aircraft AOS.

The functionality of channel B circuitry 14-2 of electronic MFP 14 and channel B circuitry 16-2 of electronic MFP 16 is reversed. In other words, channel B circuitry 14-2 performs the same functions as channel A circuitry 16-1, while channel B circuitry 16-2 performs the same functions as channel A circuitry 14-1. This provides a second set of aircraft parameters using independent system 26. Since dissimilar components, software and/or firmware are used between channels A and B, independent systems 24 and 26 are also dissimilar systems.

Figure 8:
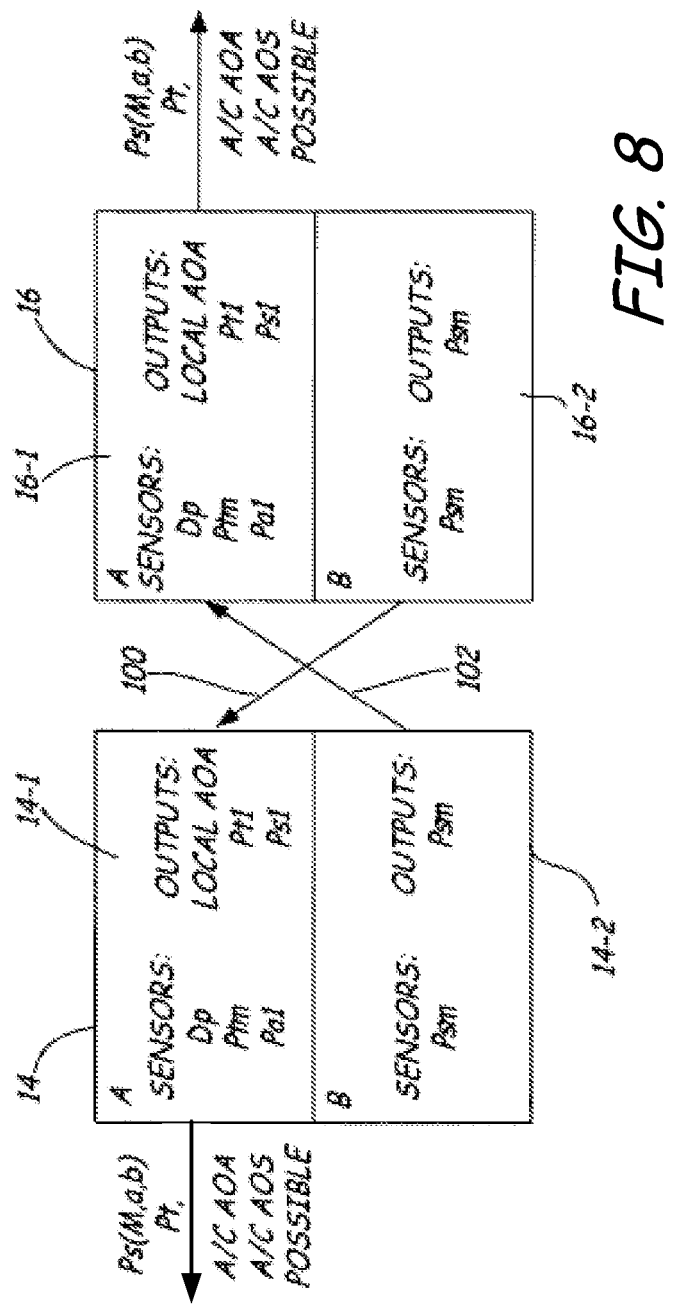

While a system such as the one shown in FIG. 7 uses two electronic MFPs to achieve two independent and dissimilar air data systems, it does require two different circuitry configurations, one for left hand side electronic MFPs and one for right hand side electronic MFPs. In these embodiments, this is necessary to achieve a separation of functionality for a particular channel (A or B) between the two probes. However, in other embodiments, this can be avoided to some extent if desired. For example, in FIG. 8, the circuit functionality of channel A circuitry 14-1 of electronic MFP 14 is substantially the same as the circuit functionality of channel A circuitry 16-1 of electronic MFP 16. The same is true between the functionality of the channel B circuitry 14-2 and 16-2. However, in this embodiment, instead of coupling the channel A circuitry of electronic MFP 14 to the channel A circuitry electronic MFP 16, and so on, channel A circuitry 14-1 is coupled with channel B circuitry 16-2, while channel A circuitry 16-1 is coupled with channel B circuitry 14-2 to form systems 100 and 102. However, in order to maintain the dissimilarity between these two independent systems 100 and 102, channel A circuitry 14-1 on left hand side electronic MFP 14 can be dissimilar from channel A circuitry 16-1 on right hand side electronic MFP 16. Likewise, dissimilarity between channel B circuitry 14-2 and 16-2 can also exist. Thus, while the channel A circuitry of each type of electronic MFP could maintain the same or similar functionality as channel A circuitry of other electronic MFPs, and likewise with the channel B circuitry of the electronic MFPs, different left and right hand side electronic MFP configurations and part numbers would still be required to some extent in order to achieve dissimilarity between systems 100 and 102.

Figure 9:
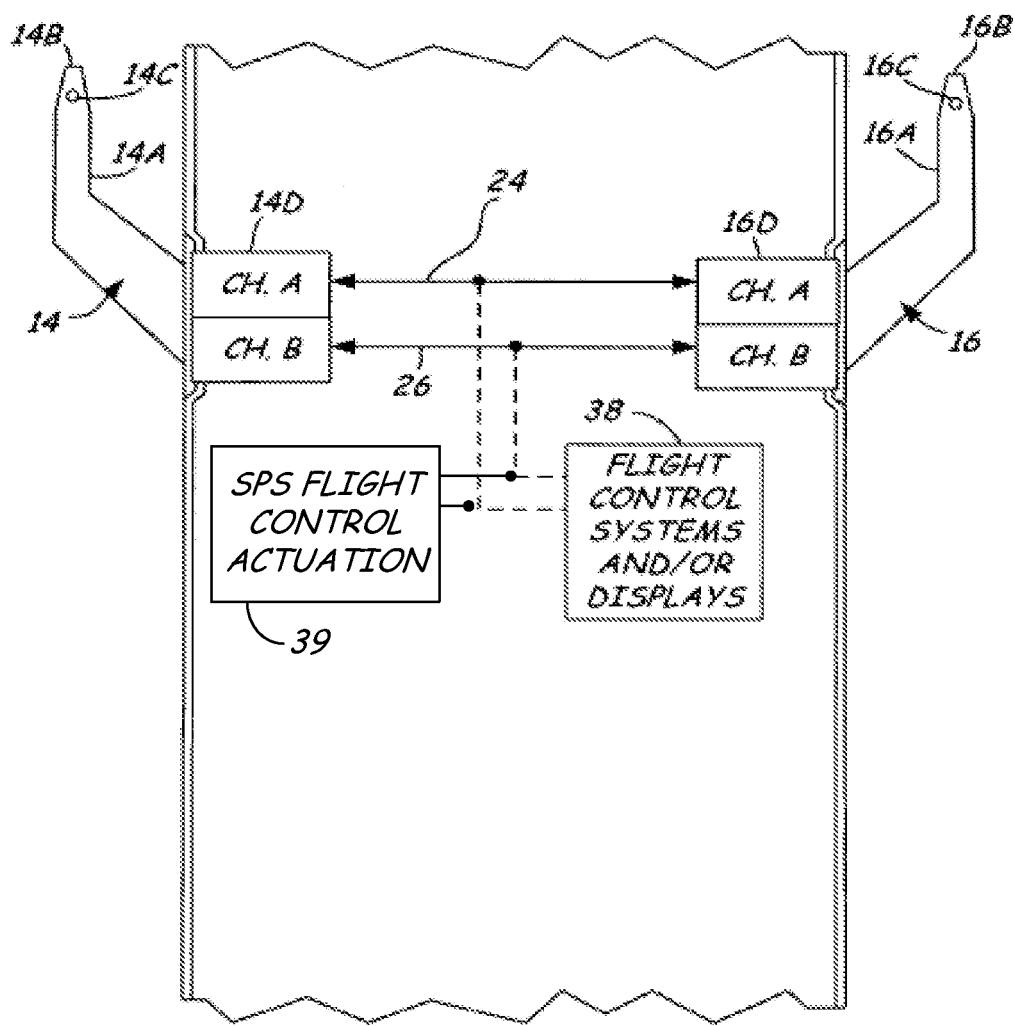
FIG. 9 is a schematic representation of a cross section of a nose portion of an aircraft showing placement of two dual-channel electronic MFPs on opposite sides of the aircraft to provide two independent and dissimilar air data systems.

While disclosed embodiments have thus far been described with reference to four dual-channel electronic MFPs combined in a manner which will provide four independent air data systems (two sets of two dissimilar systems), disclosed embodiments are not limited to four-probe configurations. For example, FIG. 9 is an illustration of a system having only two electronic MFPs 14 and 16. Electronic MFPs 14 and 16 can be connected, as described above, with each of the channels of electronic MFP 14 coupled to a corresponding one of the channels of electronic MFP 16 to form independent and dissimilar systems 24 and 26. While FIG. 7 illustrates channels A and B of electronic MFP 14 being coupled respectively to channels A and B of electronic MFP 16, this embodiment is not so limited. In other words, channel A of electronic MFP 14 can be coupled to channel B of electronic MFP 16, and vice versa, in other embodiments as described above.

Figure 10:
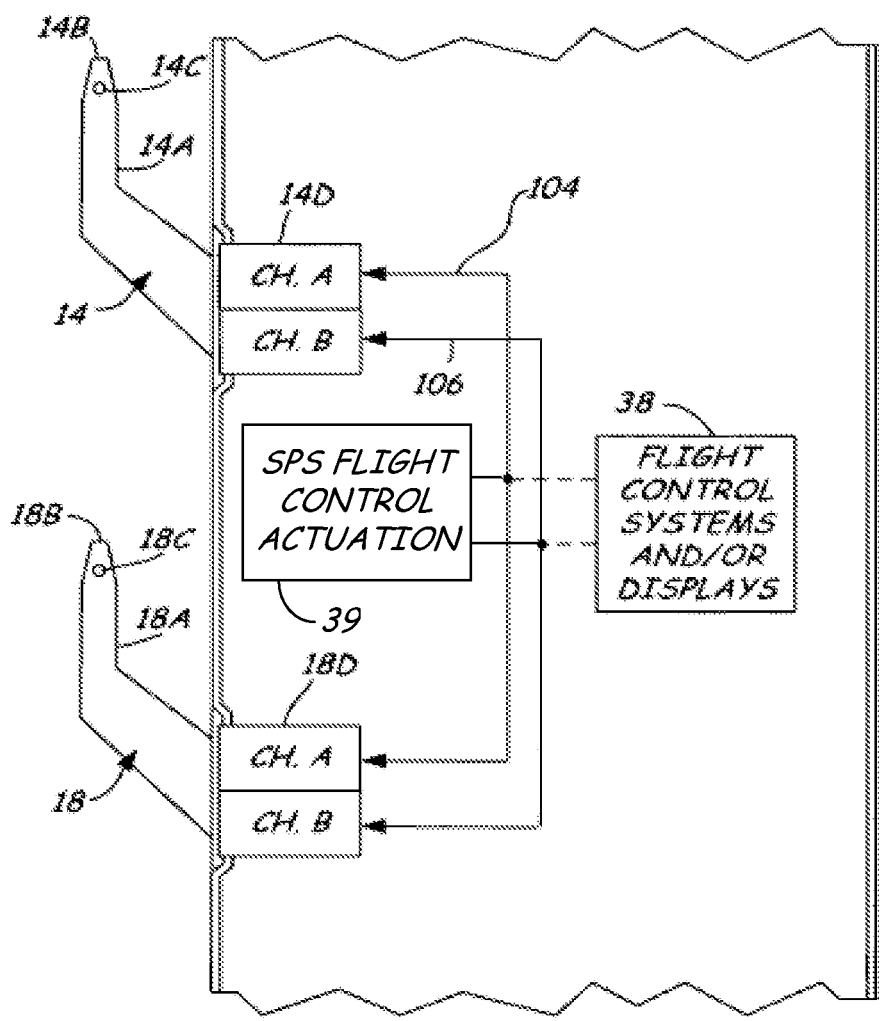
FIG. 10 is a schematic representation of a cross section of a nose portion of an aircraft showing placement of two dual-channel electronic MFPs on the same side of the aircraft to provide two independent and dissimilar air data systems.

FIG. 10 is an illustration of another two-probe configuration. In this embodiment, each of channels A and B of left hand side electronic MFP 14 are coupled to a corresponding one of channels A and B of another left hand side electronic MFP 18. In this case, electronic MFP 14 and electronic MFP 18 could not be of identical configurations (and thus part numbers) and still achieve independence and dissimilarity between the resulting systems 104 and 106. In general, disclosed embodiments are not limited to any particular configuration between dual-channel electronic MFPs. Instead, some disclosed embodiments are directed more generally to configurations in which the channels of a first dual-channel electronic MFP are coupled to the channels of a second dual-channel electronic MFP in a manner which will achieve two independent and dissimilar systems between the two electronic MFPs. Again, other embodiments can utilize dual channel MFPs without achieving independent or dissimilar systems, or can utilize single channel MFPs.

In some disclosed embodiments, a system for providing independent and dissimilar aircraft air data parameter estimations, as described herein, includes at least first and second dual-channel electronic MFPs positionable adjacent an aircraft skin. Each dual-channel electronic MFP includes a plurality of pressure sensing ports (for example positioned on a barrel, vane or cone) and an electronics housing. Within the electronics housing of each of the first and second dual-channel electronic MFPs are first and second electronics channels. The first electronics channel of the first dual-channel electronic MFP is electrically coupled with the first electronics channel of the second dual-channel electronic MFP to provide a first air data system providing aircraft air data parameter estimations. The second electronics channel of the first dual-channel electronic MFP is electrically coupled with the second electronics channel of the second dual-channel electronic MFP to provide a second air data system providing aircraft air data parameter estimations. The first and second air data systems are independent and dissimilar from one another.

It is to be understood that the first electronics channel of the first dual-channel electronic MFP being electrically coupled to the first electronics channel of the second dual-channel electronic MFP to provide a first air data system includes Channel A of the first dual-channel electronic MFP being electrically coupled to either of Channels A (see FIG. 7 for example) or B (see FIG. 8 for example) of the second dual-channel electronic MFP. The same is true for the second electronics channels being coupled. In other words, the first electronics channel of a dual-channel electronic MFP is definable as corresponding to either of Channels A or B of that dual-channel electronic MFP. The same definition can be applied to the second dual-channel electronic MFP, or the definitions can be reversed. Thus, this language used to describe embodiments such as those shown in FIGS. 7 and 8, as well as other embodiments.

Although the present invention has been described with reference to example embodiments, workers skilled in the art will recognize that changes may be made in form and detail without departing from the spirit and scope of the invention.

What is claimed is:

1. An air data and stall protection system comprising:
   first and second electronic multi-function probes (MFPs) positionable adjacent an aircraft skin, each of the first and second electronic MFPs comprising:
      a plurality of pressure sensing ports;
      one or more electronics housings;
      air data processing circuitry positioned within the one or more electronics housings and configured to generate air data parameters as a function of pressures at the plurality of pressure sensing ports, the air data parameters including airspeed and altitude of the aircraft;
      stall protection system processing circuitry positioned within the one or more electronics housings and configured to detect stall conditions as a function of at least one air data parameter from the air data processing circuitry, the stall protection system processing circuitry generating stall protection system outputs indicative of the stall conditions; and
      first and second electronics channels positioned within the one or more electronics housings;
      a heater element; and
      a heater control circuit having a software control input for controlling the heater element and a hardware control input for controlling the heater element, the heater control circuit being configured to give heater control priority to the hardware control input;
   wherein the first and second electronics channels of the first electronic MFP are electrically coupled, respectively, to the first and second electronics channels of the second electronic MFP to provide first and second air data systems each providing aircraft air data parameter estimation, and wherein in each of the first and second electronic MFPs the stall protection system processing circuitry is implemented within at least one of the first and second electronics channels such that each of the first and second air data systems has a corresponding stall protection system.

2. The air data and stall protection system of claim 1, wherein the stall protection system processing circuitry in the one or more electronics housings is configured to generate a flight control actuation output to effect flight control in response to the detected stall conditions.

3. The air data and stall protection system of claim 2, wherein the flight control actuation output generated by the stall protection processing circuitry in the one or more electronics housings includes a stick pusher control output for controlling a stick pusher to alter an angle of attack of the aircraft to eliminate the stall condition in order to prevent a stall.

4. The air data and stall protection system of claim 2, wherein the stall protection system processing circuitry in the one or more electronics housings is configured to generate a stall protection system warnings output to effect warning of a pilot of the stall conditions.

5. The air data and stall protection system of claim 1, wherein the stall protection system processing circuitry positioned within the one or more electronics housings is further configured to detect the stall conditions as a function of aircraft configuration information.

6. The air data and stall protection system of claim 1, wherein the stall protection system processing circuitry positioned within the one or more electronics housings is further configured to detect the stall conditions as a function of environmental conditions information.

7. The air data and stall protection system of claim 1, and wherein each of the first and second electronic MFPs further comprises a barrel on which the plurality of pressure sensing ports are located, and wherein the one or more electronics housings are positionable inside the skin of the aircraft while the barrel protrudes into an airstream that moves past the skin of the aircraft.

8. The air data and stall protection system of claim 1, and wherein each of the first and second electronic MFPs further comprises a vane on which the plurality of pressure sensing ports are located, and wherein the one or more electronics housings are positionable inside the skin of the aircraft while the vane protrudes into an airstream that moves past the skin of the aircraft.

9. The air data and stall protection system of claim 1, and wherein each of the first and second electronic MFPs comprises a cone on which the plurality of pressure sensing ports are located, and wherein the one or more electronics housings are positionable inside the skin of the aircraft while the cone protrudes into an airstream that moves past the skin of the aircraft.

10. The air data and stall protection system of claim 1, wherein in each of the first and second electronic MFPs one of the first and second channels is configured to implement stall protection system command functions, while the other of the first and second channels is configured to implement stall protection system monitoring functions.

11. The air data and stall protection system of claim 1, wherein the first and second air data systems are independent and dissimilar from one another.

12. The air data and stall protection system of claim 1, wherein in each of the first and second electronic MFPs the first electronics channel contains circuitry which is dissimilar from circuitry contained in the second electronics channel.

13. The air data and stall protection system of claim 12, wherein in each of the first and second electronic MFPs the circuitry contained in the first electronics channel includes pressure sensors of a first technology type, while the circuitry contained in the second electronics channel includes pressure sensors of a second technology type different than the first technology type.

14. The air data and stall protection system of claim 13, wherein in each of the first and second electronic MFPs the circuitry contained in the first electronics channel includes a first type of microprocessor, while the circuitry contained in the second electronics channel includes a second type of microprocessor different than the first type of microprocessor.

15. The air data and stall protection system of claim 1, wherein the software control input is based on aircraft configuration information.

\* \* \* \* \*